United States Patent [19]

Itoigawa et al.

[11] Patent Number: 5,824,385
[45] Date of Patent: Oct. 20, 1998

[54] OPTICAL DISC AND METHOD FOR MANUFACTURING THE SAME

[75] Inventors: Masahide Itoigawa; Shinichi Hanzawa; Yoshitaka Nonaka; Junichi Watanabe; Haruhisa Maruyama, all of Yamanashi, Japan

[73] Assignees: Pioneer Electronic Corporation, Tokyo; Pioneer Video Corporation, Yamanashi, both of Japan

[21] Appl. No.: 704,079

[22] Filed: Aug. 28, 1996

[30] Foreign Application Priority Data

Aug. 30, 1995 [JP] Japan .................................. 7-245397

[51] Int. Cl.⁶ ...................................................... B32B 3/00

[52] U.S. Cl. ...................... 428/64.1; 428/64.2; 428/64.4; 428/64.7; 428/913; 430/270.11; 430/495.1; 430/945; 369/283

[58] Field of Search ................................ 428/64.1, 64.2, 428/64.4, 64.7, 65.2, 457, 913; 430/270.11, 495.1, 945; 369/283, 288

[56] References Cited

U.S. PATENT DOCUMENTS 5,039,588 8/1991 Imai et al. ................................ 427/162
5,059,462 10/1991 Kurisu et al. ........................... 428/64.1
5,360,652 11/1994 Kobayashi et al. .................... 428/64.1

*Primary Examiner*—Elizabeth Evans
*Attorney, Agent, or Firm*—Finnegan, Henderson, Farabow, Garrett & Dunner, L.L.P.

[57] ABSTRACT

An optical disc has a pair of light-transmissible circular substrates each having an inner non-data region disposed around a center hole thereof, a data region disposed around the inter non-data region for bearing signals corresponding to information to be recorded and an outer non-data region disposed around the data region which are formed on a major surface of the substrate. The optical disc has a reflective layer formed on the data region and a protective layer made of an ultraviolet ray setting resin containing metal ions formed on the reflective layer. The optical disc has an adhesive layer made of an adhesive composition containing an ultraviolet ray setting component and an anaerobic hardening component disposed between the protective layers of the circular substrates for adhering the circular substrates.

6 Claims, 2 Drawing Sheets

OPTICAL DISC AND METHOD FOR MANUFACTURING THE SAME

BACKGROUND OF THE INVENTION

1. Field of the Invention

The present invention relates to an optical disc comprising a pair of discs bonded together and a method for manufacturing the same.

2. Description of the Related Art

In conventional optical discs such as a video disc and the like, a double sided recording disc is known which is composed of a pair of discs bonded together by an adhesive layer. Each disc comprises a circular substrate made of a light-transmissible resin on which pit rows or grooves are formed concentrically or spirally to hold information to be recorded as a data region. The disc further comprises a reflective layer and protective layer which are formed in turn on the data region. The double sided recording disc is assembled in such a manner that protective layers face each other via adhesive layer. Moreover, the double sided recording disc is operated so that the disc is clamped about a central hole and rotated and then irradiated with a reading laser beam to the data region in order to optically regenerate information.

In such a double sided optical disc of bonding-together type, a hot melt type adhesive has been generally used as its adhesive layer. However, such a hot melt type adhesive is relatively inferior in heat-resistance because of thermoplastic. Therefore, there is a problem that the double sided optical disc of bonding-together type is easily deformed and peeled off into halves by applied heat.

To overcome this problem, there is an idea that an ultraviolet ray setting is used as an alternative adhesive for bonding the two discs together. The ultraviolet ray setting in fluid hardens with application of an ultraviolet ray and has a high heat resistance. In this case, ultraviolet rays should be irradiated into the fluid ultraviolet ray setting resin through the substrate, reflective layer and protective layer in order to solidify the resin in the assembling process. Most of the ultraviolet rays are apt to be reflected and absorbed therein, and thus sufficient amounts of the ultraviolet rays are unable to reach the ultraviolet ray setting resin. As a result, much time is required for the resin to be hardened. Moreover, in the case that the ultraviolet ray setting resin contains a radical polymerization resin as a main component, Oxygen prevents the resin from hardening. If such an ultraviolet ray setting resin involves air bubbles during the bonding process, its hardening becomes difficult resulting in an insufficient adhesive strength of the resin.

SUMMARY OF THE INVENTION

Thus, the present invention has been made to solve such a problem in view of the forgoing status. An object of the invention is to provide an optical disc of improved reliability and a method for manufacturing the same.

An optical disc according to the present invention comprises;

a pair of light-transmissible circular substrates each comprising an inner non-data region disposed around a center hole thereof, a data region disposed around the inter non-data region for bearing signals corresponding to information to be recorded and an outer non-data region disposed around the data region which are formed on a major surface of the substrate, a reflective layer formed on said data region, and a protective layer made of an ultraviolet ray setting resin containing metal ions formed on said reflective layer; and an adhesive layer made of an adhesive composition containing an ultraviolet ray setting component and an anaerobic hardening component disposed between said protective layers of the circular substrates for adhering said circular substrates.

A method of manufacturing an optical disc according to the present invention comprises the steps of;

forming a pair of light-transmissible circular substrates each comprising an inner non-data region disposed around a center hole thereof, a data region disposed around the inter non-data region for bearing signals corresponding to information to be recorded and an outer non-data region disposed around the data region which are formed on a major surface of the substrate;

forming a reflective layer formed on said data region, and coating with a fluid ultraviolet ray setting resin containing metal ions on said reflective layer and said inner and outer non-data regions;

irradiating an ultraviolet ray to said ultraviolet ray setting resin to harden to form a protective layer of the ultraviolet ray setting resin;

coating on at least of the protective layers of the pair of light-transmissible circular substrates with a fluid adhesive composition containing an ultraviolet ray setting component and an anaerobic hardening component;

superimposing the pair of light-transmissible circular substrates each other in such a manner that the fluid adhesive composition is sandwiched between said protective layers of the circular substrates; and irradiating an ultraviolet ray to said adhesive composition to harden to form an adhesive layer of the adhesive composition in such a manner that at least adhesive compositions existing in the outer and inner non-data regions harden first and, subsequently, a stop of contact with air and a reaction with metal ions contained in the protective layers allow the adhesive composition existing in the data region to harden.

According to the invention, an adhesive composition having both ultraviolet ray setting and anaerobic hardening properties is used for the adhesive layer disposed between the pair of light-transmitting substrates and, at the same time, an ultraviolet ray setting resin containing metal ions is used as a protective layer. It is therefore possible that the adhesive composition is efficiently solidified by a reaction of metal ions even if air exists in the adhesive layer. As a result, the invention provides a bonding-together type optical disc of improved reliability.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DETAILED DESCRIPTION OF THE PREFERRED EMBODIMENTS

Figure 1:
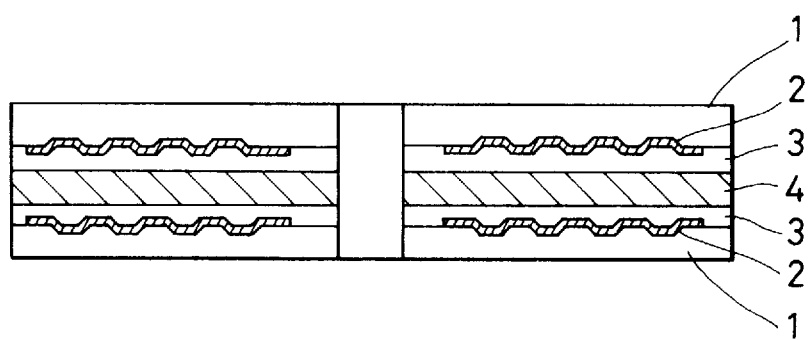
FIG. 1 is a schematic sectional view partially broken showing a reflection type optical disc of an embodiment according to the present invention.

An embodiment of the present invention will be described hereinafter with reference to the accompanying drawing. FIG. 1 shows a double sided optical disc of the present invention. As shown in FIG. 1, the optical disc comprises a pair of light-transmitting circular substrates 1, 1 each having a data region in which pits or grooves are formed to represent information by fine unevenness, except outer (non-recording) and inner (non-recording) non-data regions. The disc halves comprises a reflective layers 2, 2 which are formed in the data regions on a pair of the light-transmitting substrates 1, 1 respectively. The disc halves further comprises protective layers 3, 3 which are so formed to cover the outer and inner non-data regions and reflective layers 2, 2 on the light-transmitting substrates 1, 1 respectively. In the disc structure, an adhesive layer 4 which is used to bond a pair of disc halves having the protective layers 3, 3 in such a manner that the protective layers 3, 3 sandwich the adhesive layer and facing each other.

Any material for forming light-transmitting substrates is acceptable, so far as it allows light beams of recording and regenerating to pass through per se. For example, synthetic resins such as polycarbonate (PC) and polymethyl methacrylate (PMMA) resins and glass or the like are usable. Among them, polycarbonate (PC) resin is most preferably used because it is superior in heat-resistance and dimensional stability. When the synthetic resin is used as a material for the light-transmitting substrate, it can be produced by an injection molding method. Moreover, the size and shape of the light-transmitting substrate can be appropriately selected depending on applications of the optical disc. For example, a circular substrate with an approximately 120 mm diameter and a thickness of from 0.2 to 1.2 mm, more preferably, 0.6 mm is usable.

The reflective layers 2, 2 are made of metal films of aluminum or an aluminum alloy with a thickness of from 300 to 1000 angstroms. The reflective layer can be formed by a sputtering method, a vacuum deposition method or the like.

The protective layers 3, 3 are made of ultraviolet ray setting resins containing metal ions derived from copper oxide, iron oxide, etc., with a thickness of from 5 to 20 micrometers. The protective layer can be formed by a spin coating method, a screen printing method or the like.

The adhesive layer 4 is made of an adhesive composition comprising an ultraviolet ray setting component and an anaerobic hardening component. The ultraviolet ray setting component is an unsaturated double-bonded compound in the form of ultraviolet ray setting type monomer and oligomer) comprising acrylates. The anaerobic hardening component is a reagent for imparting anaerobic hardening property to the adhesive composition such as hydroperoxide, etc. This adhesive composition is able to harden in an atmosphere of anaerobic and/or ultraviolet ray conditions.

The method of manufacturing of the optical disc of the present invention will be described hereinafter in detail.

A pair of light-transmitting substrates are prepared each of which has a data region in which pits or grooves with fine protrusions and recesses are formed in the main face except in outer and inner non-data regions. This light-transmitting substrate is available, using a stamper, by injection molding of synthetic resins including polycarbonate (PC) or the like. The size of the substrate has a diameter 120 mm and a thickness of from 0.2 to 1.2 mm, for example, 0.6 mm.

In the next process, the outer and inner non-data regions of the substrate are covered with a mask. Then aluminum or an aluminum alloy is evaporated or sputtered to form a metal reflective layer at a thickness of from 300 to 1000 angstroms on the data region except the outer and inner non-data regions.

Subsequently, a fluid ultraviolet ray setting resin containing metal ions derived from copper oxide, iron oxide, etc., is provided at a thickness of from 5 to 20 micrometers to the reflective layer by using a spin coating method or screen printing method. The fluid resin covers the outer and inner non-data regions and the reflective layer. The ultraviolet rays is then irradiated to the ultraviolet ray setting resin to harden to form a protective layer. An ultraviolet ray setting resin "UV-PA-5" made by CEMEDINE Co., Ltd., is usable as one of examples of the ultraviolet ray setting resin containing metal ions. Such an ultraviolet ray setting resin UV-PA-5 is a transparent liquid with light indigo color and has a viscosity of 80 cps at a temperature of 20 centigrade degree. In the case of using such an ultraviolet ray setting resin, a specified resin layer of, for example, 10 micrometers in thickness, can be obtained by a spin coating method under the conditions of 3000 rpm and rotation duration of from 3 to 5 seconds, which is then irradiated with ultraviolet rays of 100 to 200 mJ/cm$^2$ to be hardened. In this way, a protective layer is formed.

Next, a fluid adhesive composition is applied onto the protective layer of the light-transmitting substrate by using a screen printing or spin coating method to form an adhesive layer at a thickness of from 10 to 20 micrometers. The fluid adhesive composition comprises a component for imparting an ultraviolet ray setting property and a component for imparting an anaerobic property (i.e., ultraviolet ray setting and anaerobic hardening type adhesive). For example, an ultraviolet ray setting and anaerobic hardening type adhesive "UV-PA-6" made by CEMEDINE Co., Ltd., can be used as the adhesive composition. Such an adhesive composition UV-PA-6 is a transparent liquid with light yellow color and has a viscosity of 4500 cps at a temperature of 20 centigrade degree. The fluid adhesive composition is applied onto at least one of the protective layers preferably by using a screen printing method.

After that, half of the pair of light-transmitting substrates is aligned with the center hole and overlaid on the other on which the adhesive layer is provided onto at least and the substrates are the layer, so that the pair of the substrates sandwich the adhesive composition layer. Then an ultraviolet ray is irradiated at a given amount e.g., 300 mL/cm$^2$ onto the adhesive composition layer through the light-transmitting substrate, so that the outer and inner non-data regions without any reflective layer harden first. Immediately after that, the hardened outer and inner non-data regions prohibit the adhesive layer from coming contact with air, so that the adhesive layer portion existing between the reflective layers hardens under an anaerobic condition. At this time, a reaction with metal ions contained in the protective layer facilitates to promote the anaerobic hardening. Therefore, the adhesive layer existing between the reflective layers anaerobically harden rapidly, even if it involves air or air bubbles or the air-tightness of the layer is low between the adjacent protective layers. By this, there is reduced time for hardening required after the disc halves are overlaid each other.

Moreover, when the amount of ultraviolet rays irradiated onto ultraviolet ray setting resins for the protective layer is applied less than that for the adhesive layer, then the surface of the protective layer is somewhat tacky. This sticky condition of the protective layer facilitates the anaerobic hardening in the overlying step above mentioned.

Furthermore, advantageous actions and effects in an embodiment of the present invention will be described hereinafter by comparison with a comparative example. There are provided a pair of disc substrates each made of polycarbonate with a 120 mm diameter and a 0.6 mm thickness in which a reflective layer and a protective layer are stacked thereon. The two disc substrates are bonded together using an adhesive layer. In the embodiment, an ultraviolet ray setting resin "UV-PA-5" made by SEMEDINE Co., Ltd. is used as the protective layer and then an anaerobic hardening adhesive "UV-PA-6" made by SEMEDINE Co., Ltd. is used as the adhesive layer. In the comparative example, "DAICURECLEAR SD-211" made by Dainippon Ink & Chemicals, Inc., and then a hot-melt adhesive "NM-4085" made by SEMEDINE Co., Ltd. is used as the adhesive layer. Moreover, both the embodiment and the comparative example have the protective layers of a thickness of from 5 to 20 micrometers and the adhesive layers of a thickness of from 20 to 40 micrometers respectively.

Figure 2:
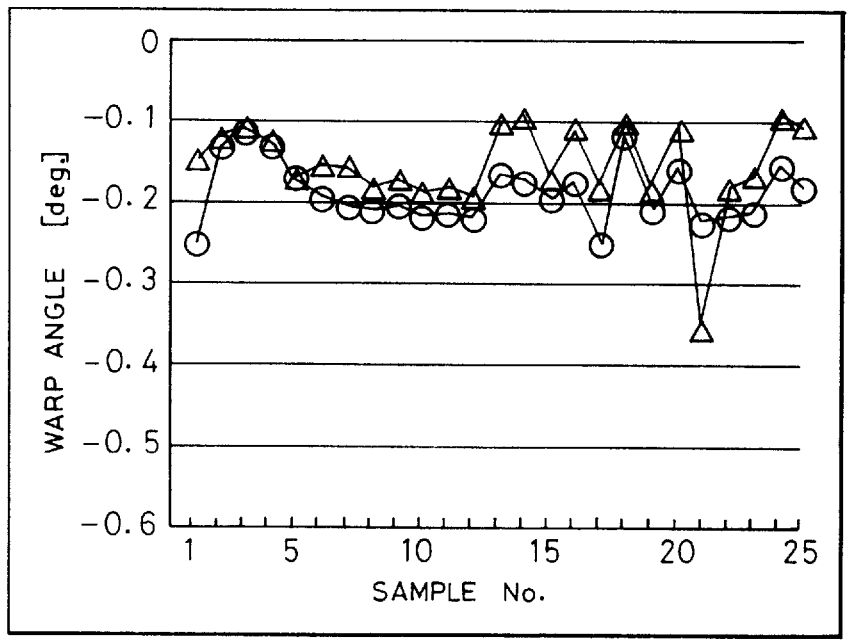
FIG. 2 is a graph showing results of measuring a warp angle of an optical disc in an embodiment according to the present invention.
Figure 3:
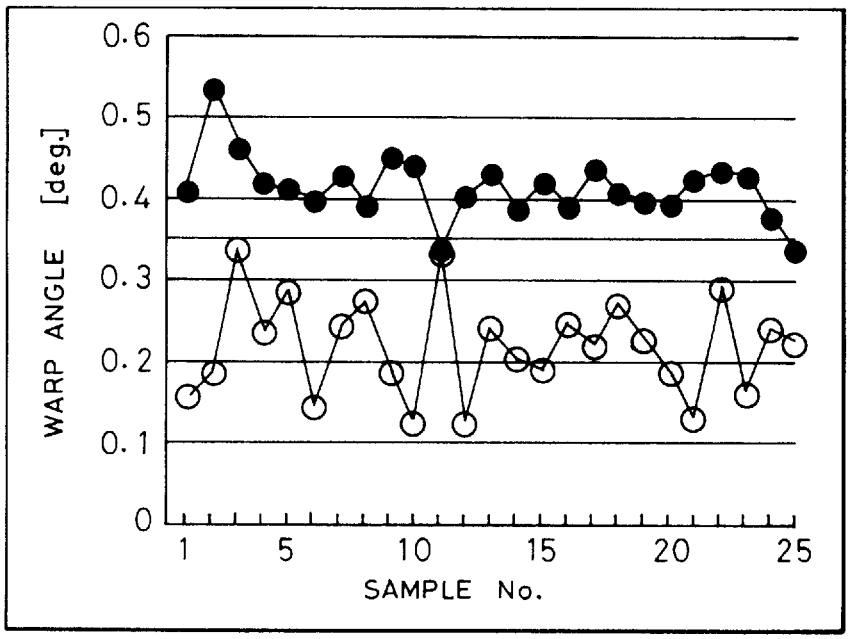
FIG. 3 is a graph showing results of measuring a warp angle of an conventional optical disc.

A constant temperature and humidity test was performed on the optical discs having above configurations shown in the embodiment and comparative example under the conditions of 60 centigrade degree, 90% R.H. 96 hrs; 25 centigrade degree, 50% R.H. 24 hrs. and then the warp angles of the samples were measured before and after the test. The measurement results are shown in FIG. 2 (for the embodiment) and in FIG. 3 (for the comparative example). In FIG. 2, circle-marks show results obtained before the test while delta-marks show those after the test. In FIG. 3, circle-marks show results obtained before the test while black-circle-marks show those after the test.

The embodiments have the mean of warp angles of −0.187 degrees before the test and the mean of warp angles of −0.146 degrees after the test. In contrast, the comparative example has the mean of warp angles of 0.220 degrees before the test and the mean of warp angles of 0.418 degrees after the test. In this measurement, the warp angle is defined as a half (alpha/2) of the angle (alpha) formed by the reflecting beam with respect to the incident beam normal to the surface of the disc.

As seen from the above measurement results, it is found that the optical disc in the embodiment provides a great improvement in the warp angle in that both its warp angle and its changes in the angle are relatively small. It is thought that this improvement has been achieved by the reason that, owing to fluidity of the adhesive layer, the adhesive layer conforms uniformly between a pair of discs and is not subjected to undue stress when applied and bonded together.

In the above-mentioned embodiment, the adhesive layer can be formed on not only one side but also both internal sides of the pair of discs. In addition to the above embodiments illustrated as the bonding-together type optical disc to be exclusively used for regeneration of information, it is needless to say that the optical disc of the present invention is usable as a writable disc in which a recording layer is formed between a data region and a reflective layer on a substrate. Moreover, the disc of the invention is also usable as a bonding-together type disc including a dummy disc having no data region but the other side of the pair of discs is used for recording data.

According to the present invention, ultraviolet ray setting and anaerobic hardening adhesives is used for bonding a pair of discs together in which the protective layers each made of ultraviolet ray setting resin containing metal ions can facilitate the anaerobic hardening. As a result, it achieves a sufficient adhesive strength. Furthermore, since the adhesive layer has a fluidity property and less warp angles, flatness of the optical disc of a pair of discs bonded together are improved.

It should thus be apparent that the scope of the teaching of this invention is not intended to be limited by only the embodiments that have been expressly disclosed and illustrated, but that instead the scope of the teaching of this invention should be read as being commensurate with the scope of the claims that follow.

What is claimed is:

1. An optical disc comprising;
   a pair of light-transmissible circular substrates
      each comprising an inner non-data region disposed around a center hole thereof, a data region disposed around the inter non-data region for bearing signals corresponding to information to be recorded and an outer non-data region disposed around the data region which are formed on a major surface of the substrate,
      a reflective layer formed on said data region, and
      a protective layer made of an ultraviolet ray setting resin containing metal ions formed on said reflective layer; and
   an adhesive layer made of an adhesive composition containing an ultraviolet ray setting component and an anaerobic hardening component disposed between said protective layers of the circular substrates for adhering said circular substrates.

2. An optical disc according to claim 1 wherein said substrate is featured by a light-transmitting substrate of 0.2 to 1.2 mm in thickness made of a synthetic resin.

3. A method of manufacturing an optical disc the present invention comprising the steps of;
   forming a pair of light-transmissible circular substrates each comprising an inner non-data region disposed around a center hole thereof, a data region disposed around the inter non-data region for bearing signals corresponding to information to be recorded and an outer non-data region disposed around the data region which are formed on a major surface of the substrate;
   forming a reflective layer formed on said data region, and
   coating with a fluid ultraviolet ray setting resin containing metal ions on said reflective layer and said inner and outer non-data regions;
   irradiating an ultraviolet ray to said ultraviolet ray setting resin to harden to form a protective layer of the ultraviolet ray setting resin;
   coating on at least of the protective layers of the pair of light-transmissible circular substrates with a fluid adhesive composition containing an ultraviolet ray setting component and an anaerobic hardening component;
   superimposing the pair of light-transmissible circular substrates each other in such a manner that the fluid adhesive composition is sandwiched between said protective layers of the circular substrates; and irradiating an ultraviolet ray to said adhesive composition to harden to form an adhesive layer of the adhesive composition in such a manner that at least adhesive compositions existing in the outer and inner non-data regions harden first and, subsequently, a stop of contact with air and a reaction with metal ions contained in the protective layers allow the adhesive composition existing in the data region to harden.

4. A method of manufacturing the optical disc according to claim 3 wherein the amount of the ultraviolet ray irradiated onto the ultraviolet ray setting resin for the protective layer is applied less than that for the adhesive layer.

5. A method of manufacturing the optical disc according to claims 3 wherein said substrate is featured by a light-transmitting substrate of 0.2 to 1.2 mm in thickness made of a synthetic resin.

6. A method of manufacturing the optical disc according to claims 4 wherein said substrate is featured by a light-transmitting substrate of 0.2 to 1.2 mm in thickness made of a synthetic resin.

* * * * *